(12) United States Patent
Schmickley et al.

(10) Patent No.: US 8,193,917 B2
(45) Date of Patent: Jun. 5, 2012

(54) ARRANGEMENT FOR THE PROPAGATION OF ALARM INFORMATION IN A BUILDING AUTOMATION SYSTEM THAT INCLUDES ONE OR MORE APPLICATIONS THAT ACCESS BUILDING SYSTEM DATA VIA A MONITORING AND CONTROL SYSTEM

(75) Inventors: Michael J. Schmickley, Algonquin, IL (US); Neil Rhodes, Evanston, IL (US); Steven Brandt, Arlington Heights, IL (US); Patrick Doran, Arlington heights, IL (US); Maurizio Bigoloni, Milan (IT)

(73) Assignee: Siemens Industry, Inc., Alpharetta, GA (US)

( * ) Notice: Subject to any disclaimer, the term of this patent is extended or adjusted under 35 U.S.C. 154(b) by 361 days.

(21) Appl. No.: 12/566,891

(22) Filed: Sep. 25, 2009

(65) Prior Publication Data

US 2010/0073159 A1    Mar. 25, 2010

Related U.S. Application Data

(60) Provisional application No. 61/194,154, filed on Sep. 25, 2008.

(51) Int. Cl.
 *G08B 9/00* (2006.01)
(52) U.S. Cl. ............... 340/286.01; 340/521; 340/539.17
(58) Field of Classification Search ............ 340/286.01, 340/286.05, 505, 506, 509, 517, 521, 539.1, 340/539.16, 539.17, 539.26, 540, 541, 628, 340/10.4; 719/310, 318; 725/105
See application file for complete search history.

(56) References Cited

U.S. PATENT DOCUMENTS

| | | | |
|---|---|---|---|
| 6,839,986 B2* | 1/2005 | Chen et al. | 36/54 |
| 7,131,136 B2* | 10/2006 | Monroe | 725/105 |
| 2003/0025599 A1* | 2/2003 | Monroe | 340/531 |
| 2003/0187938 A1* | 10/2003 | Mousseau et al. | 709/206 |
| 2006/0070127 A1* | 3/2006 | Friedlander et al. | 726/22 |
| 2007/0130599 A1* | 6/2007 | Monroe | 725/105 |
| 2008/0097624 A1 | 4/2008 | Weatherhead et al. | |

OTHER PUBLICATIONS

Franek B. et al, "SMI++ Object-Oriented Framework for Designing and Implementing Distributed Control Systems," IEEE Transactions on Nuclear Science, IEEE Service Center, New York, NY, vol. 52, No. 4, pp. 891-895, Sections I-III, Aug. 1, 2005, XP011137755, OSSM 0018-9499.

Barriuso et al, "The Detector Control System of the ATLAS experiment," Journal of Instrumentation, Institute of Physics Publishing, Vo. 3, No. 5, Sections 5,7, p. P05006, May 1, 2008, Bristol, GB, XP020140041, ISSN: 1748-0221.

Franek B et al, "An Integrated Experiment Control System, Architecture, and Benefits; The LHCb Approach," IEEE Transactions on Nuclear Science, vol. 51, No. 3, Sections I and III, Jun. 1, 2004 IEEE Service Center, New York, NY, SP011114801, ISSN: 0018-9499.

Gaspar C et al., "Tools for the Automation of Large distributed Control Systems," Real Time Conference, 2005, Sections I-V, pp. 49-53, XP010858974, ISBN: 978-0-78039183-3.

* cited by examiner

*Primary Examiner* — Van T. Trieu

(57) ABSTRACT

A method includes accessing building automation data comprising a plurality of data objects, each data object corresponding to a device in a building automation system, the data objects interrelated in a first hierarchy. The method also includes receiving an event condition indication from a first device in the building automation system, and storing an indication of the event condition in a first data object corresponding to the first device. The method also includes propagating an indication of the event condition to upstream objects in the first hierarchy.

18 Claims, 7 Drawing Sheets

```xml
<?xml version="1.0" encoding="UTF-8" ?>
<project version="2.0" xmlns="http://www.siemens.com/Nmcs"
   xmlns:xsi="http://www.w3.org/2001/XMLSchema-instance"
   xsi:schemaLocation=
   <objects>
      .
      .
      .
      <object name="Smoke Detector 1 - (537,12582914)"                   ← 502
         className="/UserDefinedClasses/Siemens Building Technologies-
         BACnet2004-1.0__EO_BA_BinaryInputObject"                         ← 504
         objectId="2306410020866">
         <objectProperty name="PhysicalName">
            <objectProperty name="Value" value="Smoke Detector 1" />       ← 506
            <objectProperty name="QualityCode" value="35" />
            <objectProperty name="TimeStamp" value="0" />                  ← 506₁
         </objectProperty>
         <objectProperty name="TechnicalAlarm">
            <objectProperty name="Value" value="0" />                      ← 506₂
            <objectProperty name="QualityCode" value="35" />
            <objectProperty name="TimeStamp" value="0" />
            <objectProperty name="StatusPropagationAffinity" value="2300" />  ← 506
            <objectProperty name="StatusPropagationType" value="1" />
            <objectProperty name="StatusPropagationAlgorithm" value="1" />
            <objectProperty name="StatusPropagationValue" value="0" />
            <arrayProperty name="ActiveChildren" resize="0" />
         </objectProperty>
      </object>
   </objects>
</project>
```

ARRANGEMENT FOR THE PROPAGATION OF ALARM INFORMATION IN A BUILDING AUTOMATION SYSTEM THAT INCLUDES ONE OR MORE APPLICATIONS THAT ACCESS BUILDING SYSTEM DATA VIA A MONITORING AND CONTROL SYSTEM

This application claims the benefit of U.S. Provisional Patent Application Ser. No. 61/194,154, filed Sep. 25, 2008, which is incorporated herein by reference.

FIELD OF THE INVENTION

The present invention relates generally to building systems, and more specifically, the manipulation of event data for use by applications that, for example, generate textual and/or graphical displays regarding portions of a building system.

BACKGROUND OF THE INVENTION

Building control systems perform automated operations within a building or series of buildings. Building control systems include comfort (i.e. HVAC) systems, security systems, lighting systems, and fire safety systems. In addition to other functions, one function of building control systems is to alert users in the case of an event occurrence that warrants attention.

Building control systems typically generate event notifications if one or more elements or conditions within or monitored by the system are operating out of boundaries. Event notifications may be generated for many reasons, including notification of a potentially dangerous or destructive condition, or of a type of malfunction affecting productivity. For example, a building heating, ventilation and air conditioning ("HVAC") system may exhibit various event notifications that indicate anything from a serious health threat, such as an air conditioning "chiller" plant failure, to a minor error status report, such as the failure of a single temperature sensor. Building fire systems also, for obvious reasons, generate various event notifications ranging from the existence of a fire and/or smoke condition to the need for routine maintenance for one or more smoke detectors.

Large building systems increasing employ data networks to transmit information, including event information, to one or more "control" locations in which event status and other system status information may be monitored. The Apogee brand building automation system, available from Siemens Building Technologies, Inc. of Buffalo Grove, Ill., is an example of a building control system that employs data networks to communicate alarm information as well as other information to one or more operator stations.

A continuing issue with large building systems arises from the presentation of system information, and particularly event (e.g. alarms), to system operators. Building systems often employ hundreds or thousands of devices that generate data. For example, a fire safety system for a campus of buildings may include scores of smoke detectors, emergency pull stations (the red, pull handles that trigger an alarm), heat detectors and other devices that generate data, event notifications and/or alarms of different priority or importance. It is critical that an operator be able to obtain event notifications and identify their source location within the building or site in an expeditious manner.

In the past, event information was presented to one or more control computers and then displayed on the computer display in a primarily text-based format. The textual information would typically identify of the device or panel that generated the event. The textual information might also identify the severity of an event, such as an alarm. The problem with a text-based event/alarm notification system is the difficulty in navigating through event information in a meaningful way. In particular, text information is typically provided as a list, which provides little or no intuitive information on location, distribution or grouping of events.

To address such drawbacks, graphical user interfaces have been employed in fire safety systems, as well as other systems. Graphical user interfaces allow users to navigate through event notification information in an intuitive and convenient way. One such graphical user interface is a system that allows the user to view hierarchical system maps that show various levels of detail (i.e. zoom levels). For example, one screen may show a map of an entire campus of several buildings. Another zoom level screen may show one of the buildings of the campus in further detail, illustrating the different floors of the building. Still another screen may show one of the floors of the building, illustrating a floor plan of the different rooms or zones of the floor. Such a system allows the user to selectively monitor the entire site or select portions of the site. An example of a system with these graphical capabilities is the FireWorks fire system workstation available from Edwards System Technologies, Inc, part of GE Security.

Manipulation of event/alarm data in a hierarchical system to enable such graphics, as well as other notification applications, can be accomplished in a number of ways. U.S. patent application Ser. No. 10/434,491, filed May 8, 2003 teaches a system of hierarchical graphic elements in which alarm indications for downstream elements in the hierarchy are automatically displayed with a particular graphic element. That system involves managing, for each graphic element, a list of all downstream elements that may have an alarm condition that should be displayed in the graphic element. During operation, when a graphic element is displayed, it includes alarm conditions of any of the downstream elements on its list.

To illustrate further this system, consider an example of a graphic element of a system is representative of a building floor. The graphic element of the floor would include alarm links for each room of the floor as well as for each sensor in each room on the floor. Thus, if one of the controllers in the room goes into alarm, then when the graphic element for the building floor is displayed, it will determine that one of its alarm links is in alarm and display the presence of that alarm.

A potential limitation to such a system is that in large systems, certain nodes will have hundreds or even thousands of descendant nodes for which alarm information should be available. For example, in a graphic view of a node representative of a floor of a large building, it may be desired to display any alarms from any of the devices in any of the rooms of the floor. Thus, the "floor" node would have alarm links to all of those devices. When the display is generated, the alarm information for all of the devices must be obtained and processed. In larger systems, such a display operation can be computationally intense, and may require significant use of communication channels in some cases.

There is a need, therefore, for a method and apparatus of manipulating alarm, or more generally, event data, in a system wherein graphics, text displays, or other application can access event information for related nodes throughout a hierarchical node structure with reduced computational effort.

SUMMARY OF THE INVENTION

At least some embodiments of the present invention address the above need by implements data records or objects for each node in a hierarchy, and propagating event information from an event originating to all relevant related nodes. Various novel methods of carrying out this process are disclosed.

A first embodiment of the invention is a method that includes accessing building automation data comprising a plurality of data objects, each data object corresponding to a device in a building automation system, the data objects interrelated in a first hierarchy. The method also includes receiving an event condition indication from a first device in the building automation system, and storing an indication of the event condition in a first data object corresponding to the first device. The method also includes propagating an indication of the event condition to upstream objects in the first hierarchy.

In a further exemplary refinement, an application requests event information for an upstream node corresponding to a first upstream object of the upstream objects. Information regarding the event condition is obtained from the first upstream object using the propagated event condition indication. Information relating to the event condition indication is then displayed.

Another embodiment includes a building automation system arrangement that implements the method.

The above-described features and advantages, as well as others, will become more readily apparent to those of ordinary skill in the art by reference to the following detailed description and accompanying drawings.

BRIEF DESCRIPTION OF THE DRAWINGS

FIG. 5 shows an diagram of a node object in accordance with an embodiment of the present invention.

DETAILED DESCRIPTION

Figure 1:
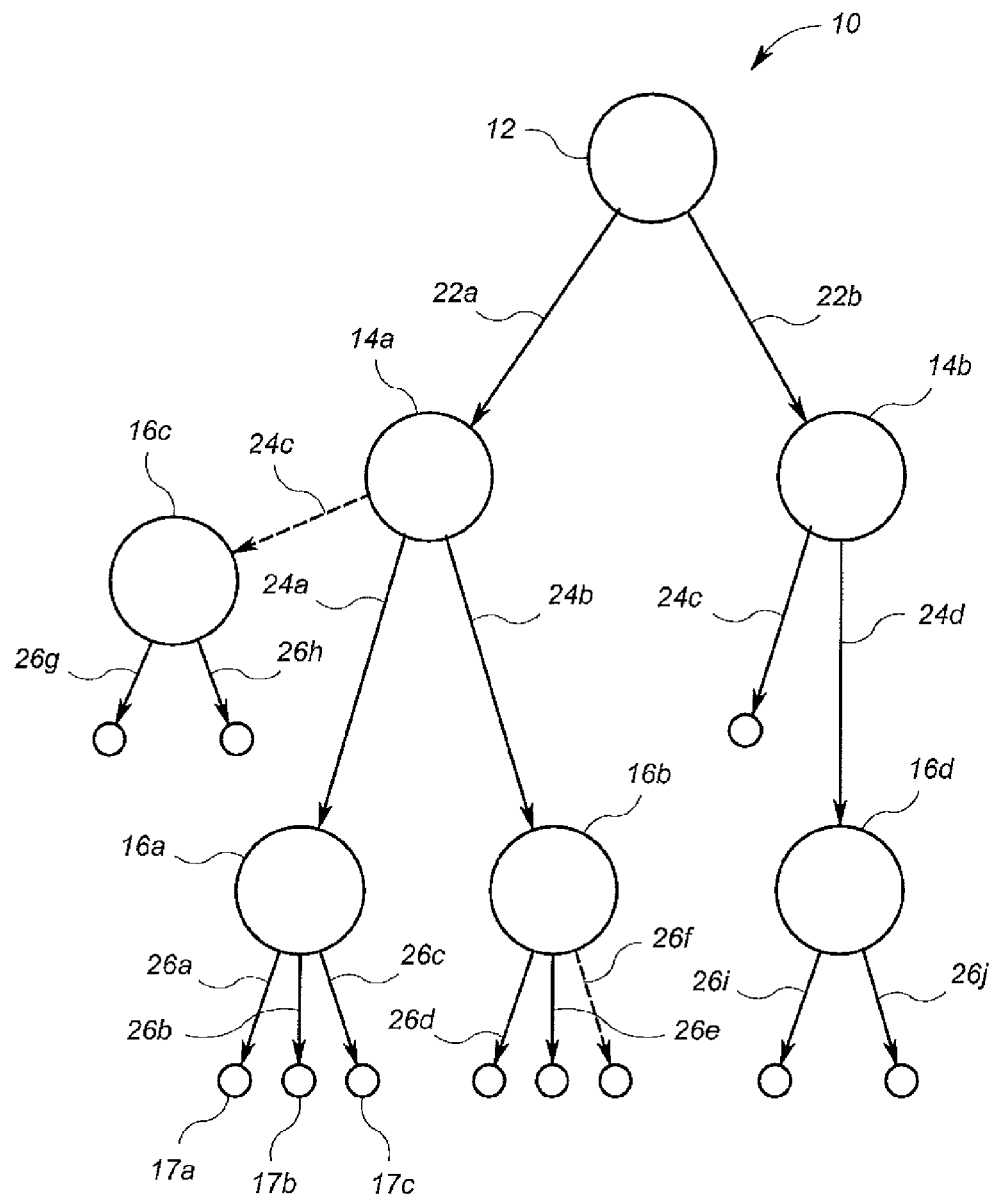
FIG. 1 shows a representation of a hierarchical node system that incorporates aspects of the present invention.

FIG. 1 shows a representation of a hierarchical node system 10 representative of a building control system. The hierarchical node system 10 includes a first level node element 12, two second level node elements 14a and 14b, and a plurality of third level node elements 16a-16e. Each node element represents a structure, device or space in a building system. For example, an element may or may not be associated with or linked to a physical device or other virtual device capable of exhibiting an event condition.

In general, as discussed herein, a node element is a construct representative of a node that may be embodiment in a data structure or object structure that is used by software to exchange data with the physical device. A link as used herein is a logical construct that represents a logical relationship between nodes. Links between nodes indicate how elements of the building system interact. When the links are implemented in software, applications can "traverse" the links to performs tasks such as generating displays that contain multiple "contained" objects. Such nodes and links form can be used to form a hierarchical system such as the hierarchical system 10 shown in FIG. 1 by those of ordinary skill in the art.

Hierarchies in building automation systems may be defined in a plurality of ways. For example, hierarchies can be based on architectural definitions. In this example, each node in the hierarchy is considered to be a part of (or contained in) its parent node. For example, the node 12 can represent a building, and nodes 14a, 14b can represent two floors of the building. In such a case, the nodes 16a, 16b, 16c represent spaces on the floor represented by the node 14a and the node 16d represents a space on the floor represented by the node 14b. The nodes 17a, 17b, 17c etc. all represent devices (sensors, actuators, etc.) located in the various spaces 16a-16d.

Another hierarchy can be based on mechanical definitions. For example, in an air flow design, each node in the hierarchy is considered to be a branch of an air flow hierarchy. For example, the node 12 can represent an air handling unit that generates heated or chilled air for supply throughout building, and nodes 14a, 14b can represent two main conditioned air ducts of the building that are connected to the output of the air handling unit. In such a case, the nodes 16a, 16b, 16c represent room/space ventilation dampers connected to the air duct represented by the node 14a and the node 16d represents a room/space ventilation damper connected to the duct represented by the node 14b. The nodes 17a, 17b, 17c etc. can represent devices sensors located in the rooms or spaces fed by the ventilation dampers represented by nodes 16a-16d.

Other hierarchies may be defined, such as those based on electrical power or control.

Referring now specifically to the system 10, the first level node element 12 has two links 22a and 22b which associate or "connect" the first level node element 12 with each of the second level node elements 14a and 14b, respectively. The links 22a and 22b allow, among other things, an operator that is current viewing the element 12 to request display of either of the second level nodes 14a and 14b. In the embodiment described herein, the second level nodes 14a and 14b are descendants, and more particularly, child elements of the first level node element 12. The first level node element 12 is the parent of the second level node elements 14a and 14b.

As shown in FIG. 1, the second level node element 14a has two links 24a and 24b, analogous to links 22a and 22b, which associate the second level node element 14a with third level node elements 16a and 16b. The third level node elements 16a and 16b are child elements of the second level node element 14a, and are in general descendant elements of both the second level node element 14a and the first level node element 12. The third level node element 16c is another descendant of the second level node element 14a and the first level node element 12.

The third level node elements 16a, 16b and 16c preferably represent physical elements or locations that bear a relationship with the parent element 14a. By way of the continuing example discussed above, the third level node elements 16a, 16b and 16c may represent rooms of the floors of the building represented by the second level node element 14a.

The third level graphic element 16a includes, or has associated with it, three data links 26a, 26b and 26c. Each of the data links 26a, 26b and 26c is a link to a building device nodes 17a, 17b, 17c. As discussed further above, each of the nodes 17a, 17b, 17c can represent building devices (e.g. sensors, controllers, actuators, pull stations, heat sensors, motion sensors, smoke sensors, etc.) that can generate event information for building systems. Types of event notifications relating to such devices can vary, and would be known to those of ordinary skill in the art.

The third level node element 16*b* similarly includes three data links 26*d*, 26*e* and 26*f* to building devices (e.g. sensors, controllers, actuators, pull stations, heat sensors, motion sensors, smoke sensors, etc.) that can generate event information for building systems.

The third level node element 16*c* also includes two distinct data links 26*g* and 26*h* to device nodes.

The nodes of the hierarchical node system 10 may be represented as objects or data structures that contain data relevant to each node. The data regarding the links in the system 10 may be stored in each object. For example, each object can store information identifying its parent and child nodes, if any. In large systems, the mapping of the nodes and links (i.e. the hierarchy of FIG. 1) is stored in a separate database. In the embodiment discussed further below in connection with FIGS. 4-7, multiple hierarchies are maintained separately from the node objects by a software service.

One use of this data is to display events or alarms for nested areas. For example, a display of the node 14*a* may include a display or listing of events from all descendent nodes thereof. It is a valuable feature of building automation systems to make available alarm and/or fault conditions visible on display screens for hierarchical descendent elements in a building system. For example, a sensor fault condition in a particular space should be displayed in the graphic displaying the space itself, and should also be displayed in the graphic displaying the floor, if not also the graphic displaying the building. Various GUI techniques may be used to allow for manipulation of the graphics to drill down.

FIGS. 4-7, described below, provide details regarding an exemplary arrangement for storing and manipulating event information in such a structure.

The system of FIG. 1 may be generalized for use in a fire alarm system, building HVAC system, security system, or even a factory automation system. All such systems create event notifications of various severity alarms associated with disparate devices for which hierarchical node representation may be useful. In some cases, event data from multiple physical systems (fire safety, security, and comfort) may be accessed in a single data application.

Figure 2:
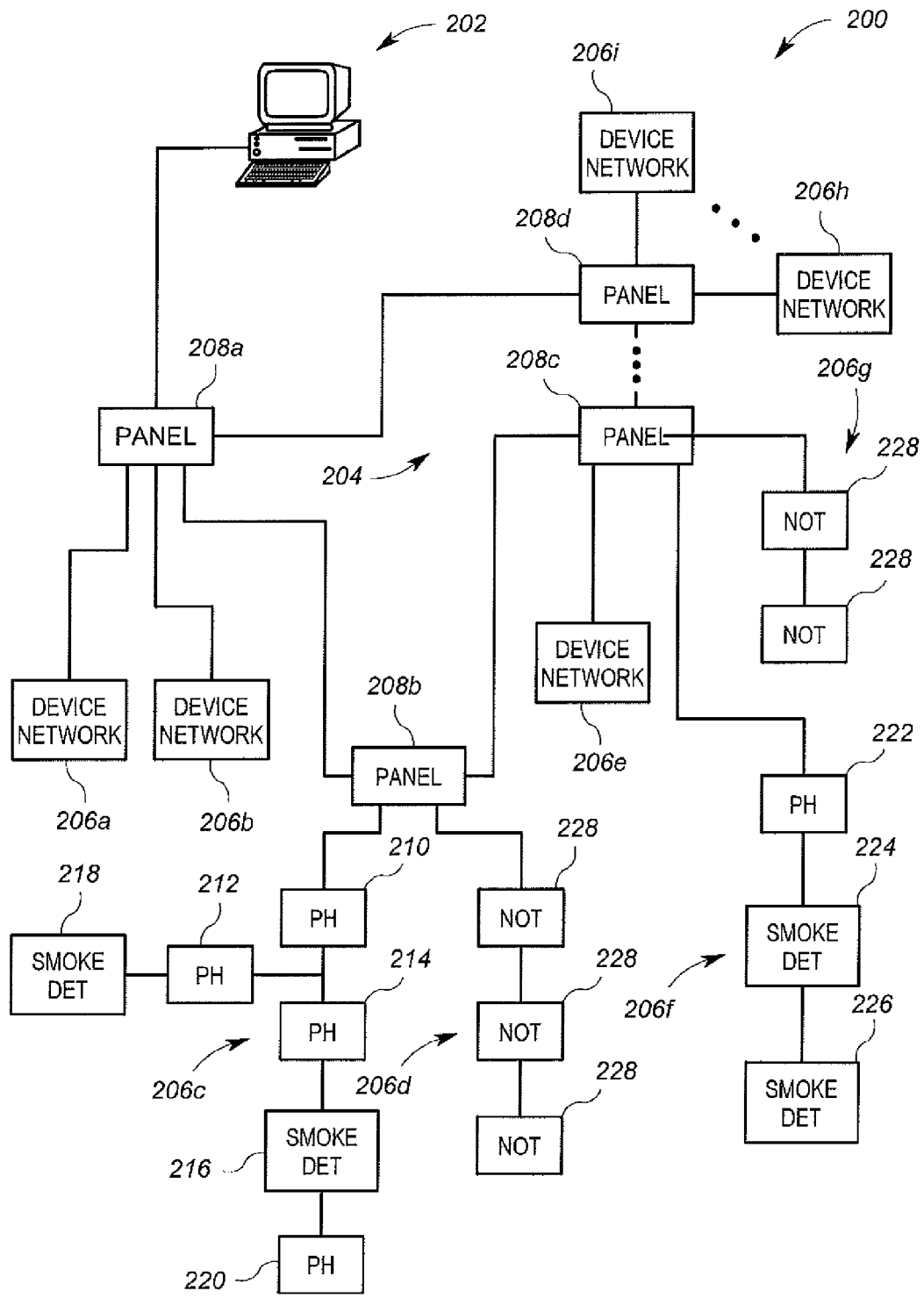
FIG. 2 shows an exemplary fire alarm network that incorporates principles of the present invention.

FIG. 2 in further detail an exemplary implementation of a building system that may be represented as a hierarchical node structure. FIG. 2 shows a block diagram of an exemplary fire safety system 200 in which the present invention may be implemented. While a fire safety system is shown here by way of example, it will be appreciated that building comfort (i.e. HVAC) systems and security systems can have a generally similar structure.

Moreover, the fire safety system 200 of FIG. 2 is a relatively simple example of a fire safety system that includes the main components typical of a fire safety system. However, the embodiment of the invention described herein may readily be adapted to fire safety systems of different scales.

Referring to FIG. 2, the fire safety system 200 includes a centralized control station 202, a building network 204, and a plurality of device networks, illustrated by exemplary device networks 206*a*, 206*b*, 206*c*, 206*d*, 206*e*, 206*f*, 206*g* and 206*h*. A series of control panels 208*a*, 208*b*, 208*c* and 208*d* logically and electrically connect the exemplary device networks 206*a* through 206*h* to the building network 204. The control panels 208*a*-208*d* are connected to each other and the control station 202 via the building network 204.

Figure 3:
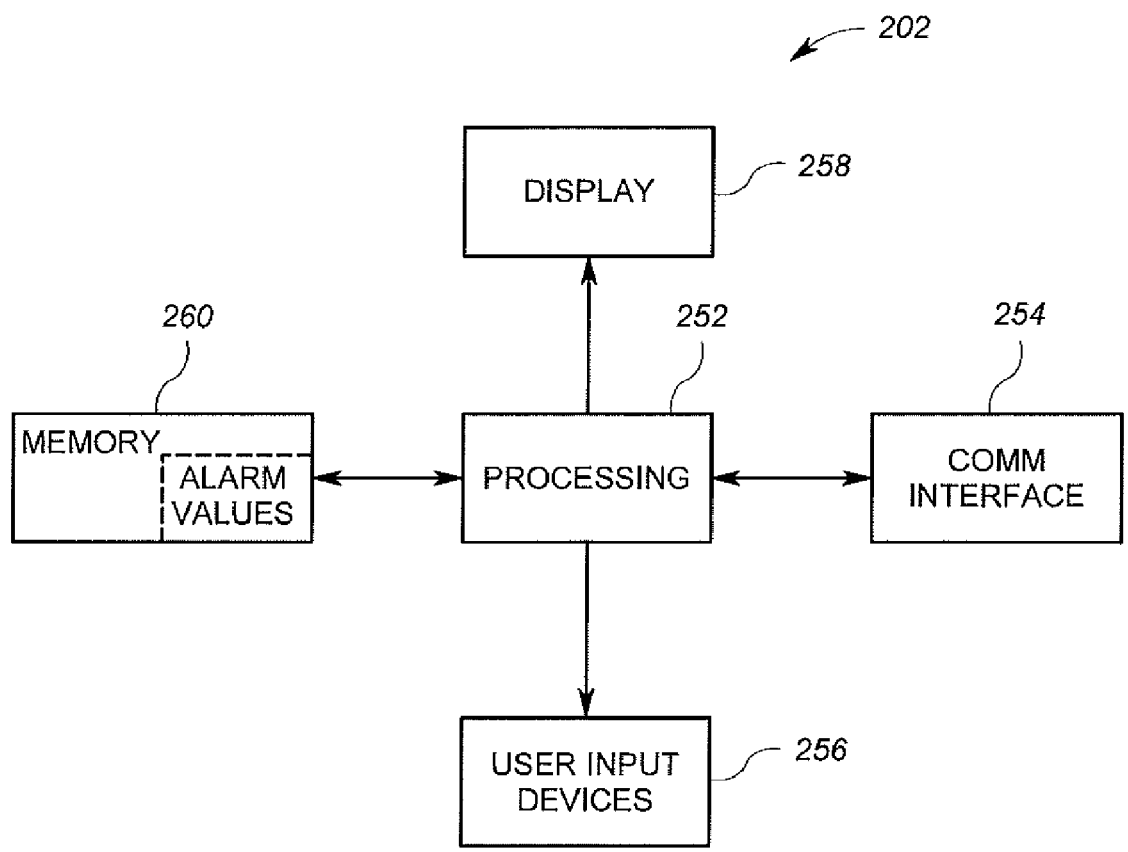
FIG. 3 shows a computer arrangement that may be used as the control station of the fire alarm network of FIG. 2.

Referring now to FIG. 3, the control station 202 is implemented as a general purpose computer. To this end, the control station 202 includes a processing circuit 252, a communication interface 254, a set of user input devices 256, a display 258, and memory 260. The control station 202 may further include a plurality of other devices, such as modems, disk arrays, printers, scanners and other devices typically employed in connection with multipurpose computers. The processing circuit 252 may be a circuit that includes any suitable Pentium-class microprocessor available from Intel, or any comparably powered microprocessor. The display 258 may be any suitable display, including a CRT display, LCD display, or plasma screen display. The input devices 256 may suitably include pointing devices, keyboards, microphones or the like.

The memory 260, which may include many types of memory devices associated with general purpose computers, including random access memory, permanent or removable disks or tapes and the like, maintains the node objects or other node data structures for the fire safety devices in the system 200 of FIG. 2. The memory 260 also maintains information regarding the hierarchical node structure of the fire safety system 200.

With regard to the node objects, the memory 260 may receive and store system variables and event information. In particular, certain devices (fire safety devices, HVAC devices or other devices) generate measured values or sensed values such as temperature, battery charge, etc. These values are stored as system variables. One or more system variables may be associated with each device. Thus, as non-alarm information is generated by various devices, such information is mapped to the appropriate node object representative of the device. Details regarding system variables are outside the scope of the present invention. In general, however, the memory 260 may be employed to store some or all of such system variables, at least temporarily.

The control station 202 generally provides centralized monitoring and control of various elements on the system 200. While some of the control of the devices of the fire safety system 200 is necessarily localized, the control station nevertheless 202 performs supervisory control and monitoring functions.

In one embodiment, the control station 202 is configured to also connected to provided centralized monitoring, and even control, of elements of the building comfort system, not shown, and security system, not shown, in the same building. Such functions of fire safety systems having a framework similar to that of the fire safety system 200 are known in the art. In addition, however, the control station 202 employs a hierarchical node system that propagates event information in a novel way that enables the user to, among other things, display hierarchical node maps or floor plans of the building in which the fire safety system 204 is implemented.

FIGS. 4-7 show in further detail how a control station such as the control station 202 can implement event information data management in accordance with an exemplary embodiment of the invention. In some cases, the control station 202 can cooperate with other client computers, not shown, to carry the operations of FIGS. 4-7. Accordingly, when "control station" is referenced below, it will be understood that the control station may be multiple physical computers (or a single computer) that interacts using a client/server architecture. One suitable client/server architecture for carrying out control station operations is disclosed in co-pending patent application Ser. No. 12/566,661, filed Sep. 24, 2009, which is incorporated herein by reference.

In FIGS. 4-7, the control station is assumed in some examples to have access to fire, security and HVAC (or comfort) system event information. This is useful because it provides single point access (from a single application) to alarms (or other event notifications) from multiple systems in a building.

In one embodiment, the control station facilitates monitoring and control of the building system in an object oriented software environment. In this environment, each of the nodes of the control system is represented as an instance of an object. For example, a different object represents each of the nodes 12, 14a, 14b, 16a and so forth of FIG. 1. Each object has a defined set of properties, and may be stored and/or conveyed as XML data records or structure data records. Data regarding the node may be stored to, and retrieved from, the object. Different node types have different object formats. Thus, for example, room objects, sensor objects, controller objects and building objects all may have different formats.

Figure 4:
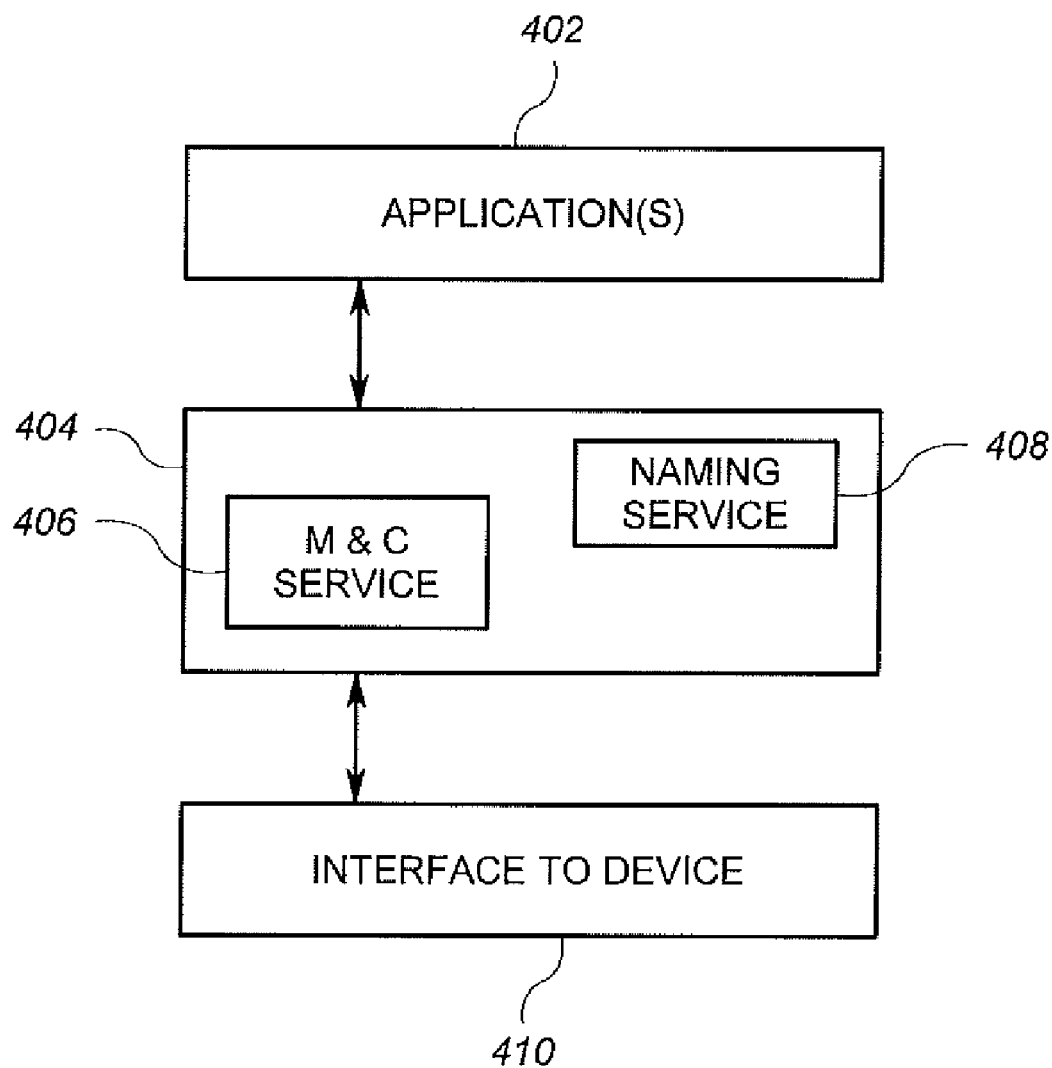
FIG. 4 shows an exemplary software structure computer arrangements that can access and monitor building automation system information.

One embodiment of the software structure is shown in FIG. 4. In FIG. 4, applications 402 employ software agents 404 to allow access to building control system information, including sensor information, control information, security information, alarm information an the like. One of the software agents 404 is a monitoring and control ("M&C") service 406 that provides access to the building data. To this end, the M&C service 406 maintains the objects that represent the nodes. The M&C service 406 obtains data regarding the node object' state via the actual building system devices via an interface 410. A node object's state may include whether the corresponding physical device is "on" or "off", in fault or alarm, or other state. In operation, if an application 402 requires data regarding a node, it employs the M&C service 406 to obtain that data.

In this embodiment, another service (referred to herein as the naming service 408) maintains the hierarchical relationships between the nodes. More specifically, as per FIG. 1, the various nodes are arranged in a hierarchical format. The relationships between the nodes in the hierarchy are maintained by the naming service 408, which may be called by various applications. It will be appreciated that there may be multiple hierarchies in a system. For example, building systems can have physical hierarchies and geographical hierarchies. A geographical hierarchy is similar to the example described above in connection with FIG. 1. A physical hierarchy may include a network at the top, field panels below the network, and devices (sensors, actuators etc.) below the field panels. The naming service 408 would maintain the multiple hierarchical relationships for the system or systems.

From a computer hardware standpoint, the software agents 404 may suitably reside on a separate computing device or workstation than the applications 402. Ideally, the applications 402 can be executed by any number of client computers, not shown, but which may have the general architecture shown in FIG. 3, which the software agents 404 reside on server computer, which may also have the general architecture shown in FIG. 3.

FIG. 5 shows a representative diagram of the basic structure of an exemplary object 500 that may be used in embodiments of the invention. FIG. 5 illustrates an instantiated object with instances of object properties. Another XML schema, not shown, defines the object types and property types from which the object 500, and any other objects, may be created or instantiated.

The node object 500 has an object name 502, an identifier of the object class 504 and a series of property instances 506. The property instances 506 are instances of property types defined for the object type, as discussed above. In particular, each node object is an instance of a class, and each property corresponds to a property type for that class. The terms class, object and property are terms commonly used in universal modeling language known in the art. The object 500 is instantiated using the defined class and the available data necessary to provide the instances of the properties 506.

While some properties of an object are essentially static, other properties are variables or values that can be changed during real-time operation of the building management system 200, such as state values (for event or alarm states). The value of a property of an instantiated object for a node may be altered as part of the data manipulation performed by the M&C service 406. For example, when new data regarding a particular object is received by the M&C service 406, the relevant property 506 of the node object 500 changes in value.

By way of example, the node object 500 corresponds to a smoke detector sensor. The object 500 includes a static property $506_1$ which is a text description of the node. The object also includes an instantiated property of "TechnicalAlarm" $506_2$ that describes a specific type of alarm that is possible for the object. The property "TechnicalAlarm" includes further properties "Value", "Quality Code", "Time Stamp", "StatusPropagationValue" and "ActiveChildren".

In this example, the Value property of TechnicalAlarm has a value that identifies whether a "technical alarm" condition is present. If an event condition that is characterized as a technical alarm is present, then the Value property would have a value of "1". In addition, the "ActiveChildren" property of TechnicalAlarm defines whether any node objects that are below the current node in any hierarchy are in alarm. The value of the ActiveChildren property is an array or list of such child objects with active event conditions.

As shown in FIG. 5, the smoke detector "Smoke Detector 1" does not have a current technical alarm ("TechnicalAlarm-"""Value"=0), and there are no lower devices in any defined hierarchies that have a technical alarm. It will further be appreciated that in this particular configuration, the node object 500 would include a separate list of "ActiveChildren" for each type of alarm applicable to the node. For example, the node object 500 could also include an instantiated "TechnicalFault" property, not shown, but which would be similar to the TechnicalAlarm property. The TechnicalFault would have its own "ActiveChildren" array or list.

It will be appreciated that the node object 500 will typically have many more properties, including any sensor values, manufacturer identification, maintenance dates, installation date, alarm history, etc. The node object 500 is shown in truncated format in FIG. 5 for clarity of exposition.

Referring to FIG. 4, one of the applications 402 that may use the M&C service 406 is an event status application in which a user may view the event (i.e. alarm, fault and/or exclusion) status for one or more nodes. By way of example, in a campus of three buildings, the user may employ such an application to view all of the alarms or fault conditions of the first building. In such a case, the user identifies the node representative of the building and requests the types of events to be displayed. For example, the user may request all security system alarms and faults in a building to be displayed, either as text or graphically. The application 402 employs the M&C service 406 to obtain the relevant data. The application 402 can then use other services or methods to display the data in text or graphical format, as is known in the art.

One of the features of the present invention is that event information is propagated up the hierarchy from the node that originated the event to all of the nodes that are above the node in the hierarchy. For example, referring to FIG. 1, when an event such as a fire system alarm, fault or exclusion, a security system alarm, fault or exclusion, or a comfort system alarm, fault or exclusion occurs in a device such as the controller 16b, the indication of a fault at node 16b is propagated to the object for the node 14a and the node 12.

As a result, when a request is made to an application to display all events for a node, the M&C service 406 can efficiently obtain information regarding all relevant active events related to the node. By contrast, in prior art systems, the M&C service (or its equivalent) would have had to review data for all nodes below the current node for any active events.

Consider an example wherein a building node (e.g. node 12 of FIG. 1) has 10,000 lower nodes for which active events (i.e. alarms, faults and exclusions) are relevant. Under the prior art systems, if a request is made to obtain event information for the building node, it would have to be determined whether there was an active event for each of the 10,000 lower nodes. If only 30 nodes have active events, then 10,000 nodes are queried or searched only to yield 30 positive results. By contrast, by propagating the 30 events up the hierarchy as they occur or are updated, then when the request is made, only the relevant 30 nodes are queried or retrieved.

Figure 6:
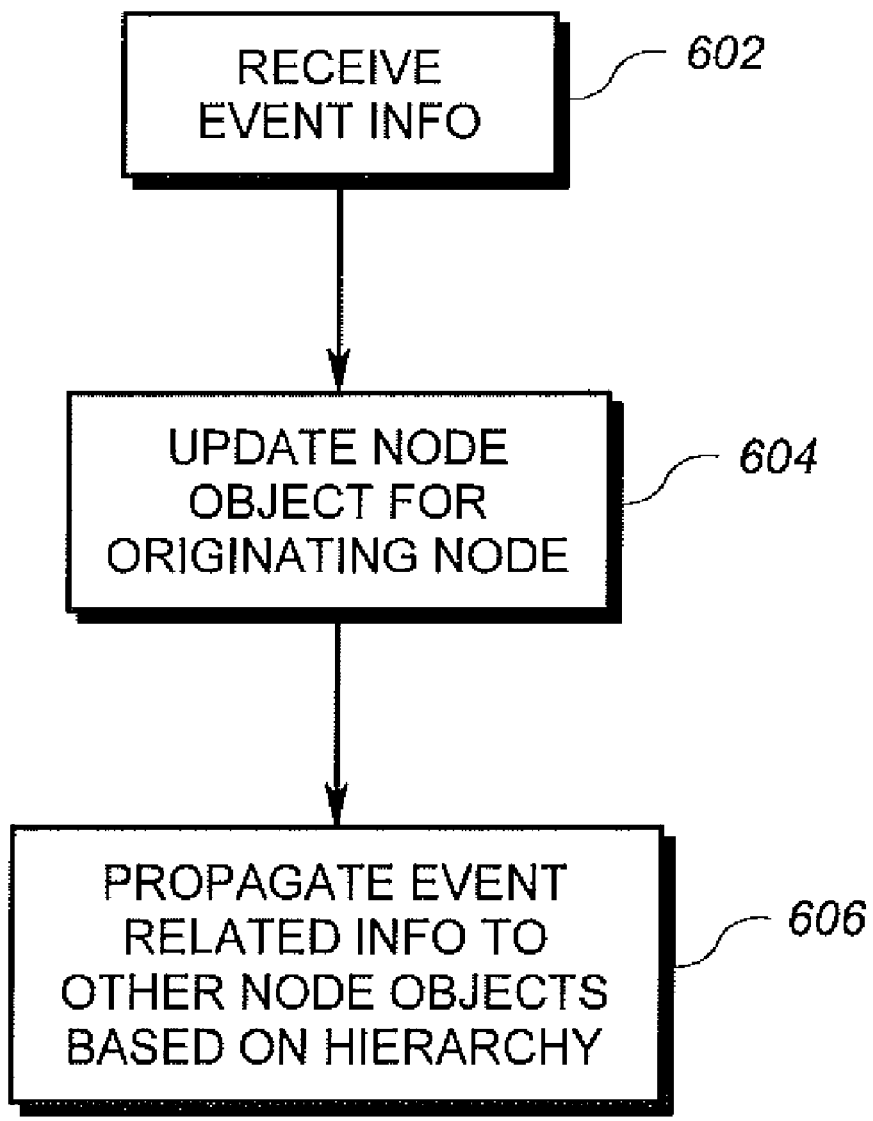
FIG. 6 shows a flow diagram of an exemplary set of operations that are used to propagate event information throughout related node objects of a building system in accordance with an embodiment the present invention.
Figure 7:
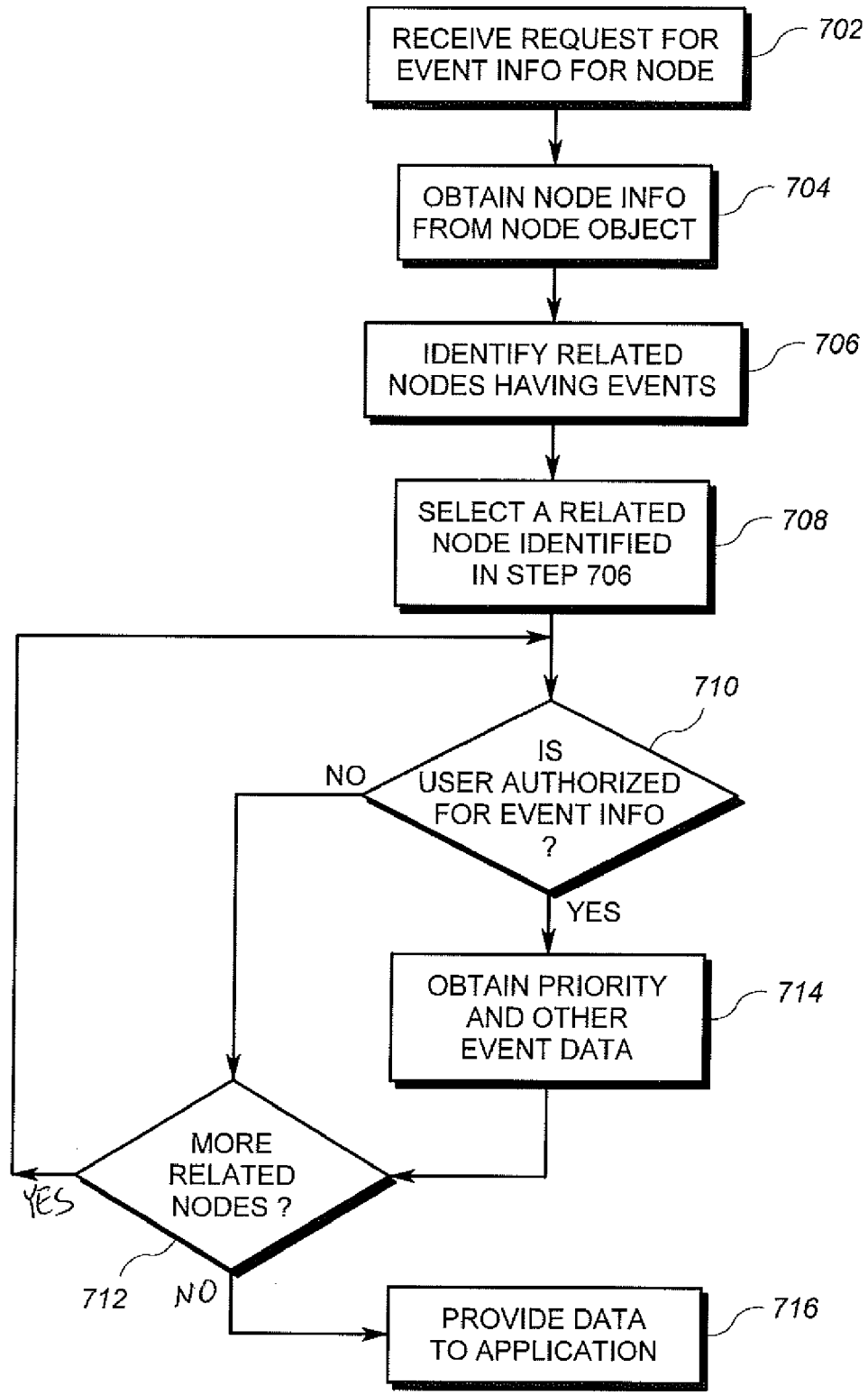
FIG. 7 shows a flow diagram of an exemplary set of operations that employ the propagated event information and node objects to generate event information relating to a selected node in accordance with an embodiment of the present invention.

FIGS. 6 and 7 show operations performed to facilitate such operations. FIG. 6 shows operations used to propagate alarms up the hierarchy. In step 602, the M&C service 406 receives or identifies an event condition in a node. Such an indication may be communicated via the interface to devices 410 of FIG. 4. In step 604, the M&C service 406 changes or updates the property of the instantiated object for the affected node, which is stored such that it may be accessed by various applications. The stored information preferably includes the type of event, for example, alarm, fault or exclusion event, and a priority of the event, for example, high, medium or low priority associated with the event.

Thus, the object for the node that originated event contains the type and priority of alarm condition associated with the node. If the node object is represented using XML formatted data, the M&C service would change a value in the appropriate property (e.g. "Value" of the TechnicalAlarm property 506$_2$ of FIG. 5) for the instance of the alarm type and priority within the instantiated node object.

In some cases, the node object does not include such property values, but rather includes status values from which alarm types and priorities may be mapped using another service. For example, a smoke detector object may have a status property that can be "on" or "off". This property maps, based on the object type, to an indication of a fire system alarm. Thus, in step 604, the only value stored within the originating object is a status change to a property, which can then be mapped by other methods or services to an event type and priority.

In any event, in step 606, the M&C service 406 propagates the identifier of the current (event originating) node to node objects that are higher in the hierarchies supported by the system. To this end, the M&C service 406 may suitably use the naming service 408 to identify the next highest or parent node (or nodes) to the current node, the next highest node from that parent node, and so forth, until the highest node in the tree (from the node originating the event) is reached. This process is executed for all hierarchies supported by the system. For example, the node may have one parent node for one hierarchy (e.g. architectural), and another parent node for another hierarchy (e.g. mechanical or control).

For each of the identified nodes, the M&C service 406 stores the current node identifier in the appropriate event property or field in the identified nodes' object. In the embodiment described herein, the M&C service 406 adds the identification of the current node identifier in the "ActiveChildren" property for the identified nodes' object.

An example of the operations of FIG. 6 can be carried out with reference to FIG. 1. Consider an example in which an event, for example, a "fault" occurs in the node 16b. For example, a controller (node 16b) may lose a connection to a sensor and thus detect a priority 1 fault in the comfort system at node 16b. The M&C service 406 at the control station receives a notification of the fault in step 602. In step 604, the M&C stores in the object associated with node 16b, the type (comfort system fault), and priority (1).

In step 606, the M&C service 406 obtains from the naming service that node 14a and 12 are related nodes that are higher on a first hierarchy from the node 16b. Thereafter, the M&C service 406 causes identification of the fault information for node 16b to be added to the "ActiveChildren" property of the objects associated with the nodes 12 and 14a. As a result of these types of operations, the object representative of the node 12 includes an identification of active alarm events in any lower/descendant nodes 14a, 14b, 16a, 16b, 16c, and/or 16d (plus the devices below the nodes 16a-16d). Similarly, the object representative of the node 14a includes an identification of active alarm events in any lower/descendant nodes 16a, 16b, and/or 16c (plus the devices below the nodes 16a-16c).

In addition, the M&C service 406 obtains from the naming service identification of other higher nodes in additional defined hierarchies. The M&C service 406 causes the identification of the fault information for node 16b to be stored as a property of the objects associated with such other higher nodes in such other defined hierarchies.

As discussed above, the propagation of events upward in a defined building system hierarchy more or less as they occur provide advantages when access to event information is required. Propagation up through multiple hierarchies provides the additional advantage of allowing a user to be made aware of alarm events in different contextual views of the system on a computer display.

It will further be appreciate that if a node having an alarm condition transitions to a normal state in which no active alarm condition remains, the transition is propagated in the same way. However, once the parent node objects are identified, the identification of the node that has returned to normal is removed from the "ActiveChildren" property.

FIG. 7 shows an exemplary operation of the M&C service 406 to generate node event information, for example, for an application 402 that displays all relevant event information for a node. As discussed above, an application 402 may allow a user to request all events, or specific types or subsets of events, associated with a node, for example the node 14a of FIG. 1. Some applications 402 inherently include the function of displaying relevant alarm events to authorized users, without requiring a specific request.

In either case, the M&C service 406 must identify the events of the selected node, plus all events of nodes below the selected node on the hierarchy. Thus, if the user elects to display alarms of the node 14a via the application 402, then the application 402 will display any alarms originated at the node 14a, as well as alarms originated at the nodes 16a-16c, plus their sub-nodes, if any.

Referring specifically to FIG. 7, in step 702, the M&C service 406 receives a request from an application 402 for information to be displayed with respect to a specific node. In other words, if a user employs an application 402 to request a display of a room or device, then the M&C service 406 receives a request for information relating to the node of the room or device. As discussed above, some alarm or event display information applications do not require specific user requests. However, a user may employ an application to drill down to specific types of events that are lower priority, and thus are not always displayed.

In step 704, the M&C service 406 obtains object information from the node object relating to the requested node. For example, if the user selected a node relating to a building, then at least some information (such as a graphical floor plan) of the building would be retrieved via the object corresponding to the node. The M&C service 406 also obtains all information regarding any events originating at the selected node. The application 402 would use the information to help build the graphical display as is known in the art.

In step 706, the M&C service 406 further obtains from the node object an identification of all events originating at other nodes that are relevant to the selected node. In particular, as a result of the operations of FIG. 6, discussed above, each object contains references to all related nodes (typically descendant nodes) that also have events. Once the related nodes having events are identified in step 706, the M&C service 406 proceeds to step 708. In step 708, the M&C service performs a series of steps 710, 712, 714 (or subsets thereof) for each of the related nodes identified in step 706. Thus, step 710 is first performed with a first of the related nodes identified in step 706.

In step 710, the M&C service 406 determines whether the event at the select related node is available to the user, i.e. whether the user is authorized to obtain information regarding the event. To this end, it will be appreciated that different users have different authorization profiles providing access to different kinds of alarms, among other things. To facilitate this, each authorized user in one exemplary embodiment has a set or list of object types and corresponding property types that the user is allowed to view and/or manipulate. Thus, a user would have to have authorization for "TechnicalAlarm" in devices of the object type of the object 500 in FIG. 5 to view (or manipulate) the "TechnicalAlarm" value.

Accordingly, in step 710, the M&C service 406 compares the authorization definition for the user to the each identified event. By way of example, the authorization definition for a user may list the object types and property types for which the user is authorized. If the user is authorized for the "alarm" property type for the object type of the select related node, then the event is available to the user.

If the event is not available to the user, then the M&C service 406 proceeds to step 712 and no value is returned to the application. In other words, if the user does not have an authorization level required to receive information relating to a specific alarm, then the user will not receive the alarm. In step 712, the M&C service 406 determines whether there are additional related nodes to check of the related nodes identified in step 706. If so, then the M&C service 406 returns to step 708 to process the next related node identified in step 706. If not, however, then the M&C service proceeds to the final step 716, discussed further below.

Referring again to step 710, if the M&C service 406 determines that the event at the select related node is available to the user, then the M&C service 406 proceeds to step 714. In step 714, information relating to the event priority, and any other useful event information is obtained from the node object of the related node. The M&C service 406 then proceeds to step 712 to determine whether additional related nodes need to be processed.

If at any time the answer in step 712 is yes, then the M&C service 406 proceeds to step 716. In step 716, the values retrieved during step 714 are provided to the application for display or other use.

It will be appreciated that the above describe embodiments are merely illustrative, and that those of ordinary skill in the art may readily devise their own implementations and modifications that incorporate the principles of the present invention and fall within the spirit and scope thereof.

We claim:

1. A method, comprising:
    a) accessing building automation data comprising a plurality of data objects, each data object corresponding to a space or device in a building automation system, the data objects interrelated in a first hierarchy linking the plurality of data objects and as a series of parent and child objects;
    b) receiving an event condition indication from a first device in the building automation system;
    c) storing an indication of the event condition in a first data object corresponding to the first device;
    d) propagating an indication of the event condition to upstream objects in the first hierarchy, wherein the upstream objects include a parent object of the first data object.

2. The method of claim 1, wherein step d) further comprises storing an indication of the event condition in the upstream objects.

3. The method of claim 1, wherein step d) further comprises:
    i) employing a hierarchy service to determine the upstream objects for the first object;
    ii) storing information relating to the event condition in data records for each of the upstream objects.

4. The method of claim 1, wherein step d) further comprises:
    modifying a value of an alarm property in each of the upstream objects to include information identifying the first data object.

5. The method of claim 1, wherein the data objects are further interrelated in a second hierarchy, and further comprising propagating an indication of the event condition to upstream objects in the second hierarchy.

6. The method of claim 1, further comprising:
    e) receiving from an application a request for event information for an upstream node corresponding to a first upstream object of the upstream objects;
    f) obtaining information regarding the event condition from the first upstream object using the propagated event condition indication; and
    g) displaying information relating to the event condition indication.

7. The method of claim 1, further comprising:
    e) receiving from an application a request for event information for an upstream node corresponding to a first upstream object of the upstream objects;
    f) obtaining information regarding the event condition from the first upstream object using the propagated event condition indication;
    g) evaluating user authorization information and information regarding the event condition;
    h) displaying information relating to the alarm condition indication based on the evaluation of step g).

8. The method of claim 1, wherein the first device is at least one selected from a group consisting of: a sensor, a controller, an actuator, a pull station, a heat sensors, a motion sensor, and a smoke sensor.

9. The method of claim 1, wherein the first data object further includes data correlating one or more event condition types with one or more user authorization levels.

10. An arrangement for use in a building automation system, comprising:
   a) a plurality of building automation devices, including at least one sensor, and at least one controller;
   b) a processing arrangement operably coupled to receive an event condition indication from a first device of the plurality of building automation devices, the processing arrangement configured to:
      access building automation data comprising a plurality of data objects, each data object corresponding to a space or device in a building automation system, the data objects interrelated in a first hierarchy linking the plurality of data objects as a series of parent and child objects;
      store an indication of the event condition in a first data object corresponding to the first device;
      propagate an indication of the alarm condition to upstream objects in the first hierarchy, wherein the upstream objects include a parent object of the first data object.

11. The arrangement of claim 10, wherein the processing arrangement is further configured to receive from an application a request for event information for an upstream node corresponding to a first upstream object of the upstream objects;
   obtain information regarding the event condition from the first upstream object using the propagated event condition indication; and
   provide to the application information relating to the event condition indication.

12. The arrangement of claim 11, further comprising a second processing arrangement configured to execute the application and further comprising a display configured to display the information relating to the event condition.

13. The arrangement of claim 11, further comprising a memory storing the first data object, the memory operably connected to the first processing arrangement.

14. The arrangement of claim 13, wherein the first data object includes data identifying the first device.

15. The arrangement of claim 14, wherein the first data object includes data correlating one or more event condition types with one or more user authorization levels.

16. The arrangement of claim 15, wherein the parent object corresponds to a room within a building.

17. The arrangement of claim 13, wherein the first data object includes data identifying the first device.

18. The arrangement of claim 10, wherein the first data object further includes data correlating one or more event condition types with one or more user authorization levels.

* * * * *